United States Patent
Brandhuber et al.

(10) Patent No.: US 11,637,987 B2
(45) Date of Patent: Apr. 25, 2023

(54) BUNDLING OF CAMERA AND RADAR RAW DATA CHANNELS

(71) Applicant: Conti Temic microelectronic GmbH, Nuremberg (DE)

(72) Inventors: Alexander Brandhuber, Lindau (DE); Karsten Breuer, Oberreute (DE); Thomas Wichmann, Lindau (DE); Manfred Gantner, Lindau (DE); Manuel Walter, Lochau (AT)

(73) Assignee: Conti Temic microelectronic GmbH, Nuremberg (DE)

(*) Notice: Subject to any disclaimer, the term of this patent is extended or adjusted under 35 U.S.C. 154(b) by 9 days.

(21) Appl. No.: 17/247,972

(22) Filed: Jan. 4, 2021

(65) Prior Publication Data

US 2021/0127088 A1  Apr. 29, 2021

Related U.S. Application Data

(63) Continuation of application No. PCT/DE2019/200052, filed on May 29, 2019.

(30) Foreign Application Priority Data

Jul. 4, 2018 (DE) ............... 10 2018 211 036.0

(51) Int. Cl.
    *H04N 7/084*  (2006.01)
(52) U.S. Cl.
    CPC ..................... *H04N 7/084* (2013.01)
(58) Field of Classification Search
    CPC .. H04N 7/084; G06F 13/3625; G06F 13/4282
    See application file for complete search history.

(56) References Cited

U.S. PATENT DOCUMENTS

| 2016/0212456 A1* | 7/2016 | Bohm ............. H04N 21/23602 |
| 2018/0113196 A1* | 4/2018 | Subburaj ................ G01S 13/34 |

FOREIGN PATENT DOCUMENTS

| DE | 102015211107 A1 | 12/2016 |
| DE | 102015224782 A1 | 6/2017 |
| EP | 3324548 A1 | 5/2018 |

OTHER PUBLICATIONS

German Search Report dated Jan. 11, 2019 for the counterpart German Patent Application No. 10 2018 211 036.0.
International Search Report and the Written Opinion of the International Searching Authority dated Sep. 20, 2019 for the counterpart PCT Application No. PCT/DE2019/200052.

* cited by examiner

*Primary Examiner* — Michael E Teitelbaum

(57) ABSTRACT

An apparatus and a method for bundling two data channels via a point-to-point connection, is described herein. Sequences of data from a first data channel are transmitted via a first line and sequences of data from a second data channel are transmitted via a second line to a multiplexing apparatus. A data gap having a predefined size is arranged between two sequences of first data in each case. The data from the second data channel are transmitted to a buffer and, if the buffer has been filled with second data having a predefined size, are inserted into the data from the first data channel. A third data channel is formed at the output of the multiplexing apparatus using these first data and second data and is transmitted to a third line. The third data channel therefore has a bundling of sequences of first data and sequences of second data.

20 Claims, 4 Drawing Sheets

BUNDLING OF CAMERA AND RADAR RAW DATA CHANNELS

CROSS REFERENCE TO RELATED APPLICATION

This application is a continuation of International application No. PCT/DE2019/200052, filed May 29, 2019, which claims priority to German patent application No. 10 2018 211 036.0, Jul. 4, 2018, each of which is hereby incorporated by reference.

TECHNICAL FIELD

The technical field relates generally to transfer of data via a point-to-point connection and more particularly to transfer of automotive sensor data via a point-to-point connection.

BACKGROUND

Point-to-point connections, in particular communication connections, are used in order to transmit data via a line.

One possible application can be transmitting raw data from image sensors and from radar sensors via such lines. One possible application can be that said data are acquired in a vehicle and are used, e.g., for assistance systems. A group of these applications can be so-called ADAS ("Advanced Driver Assistance Systems") applications. In the case of these, large volumes of data from different sensors— e.g., radar, lidar, ultrasonic, laser, video-based systems such as cameras, etc.—are merged, visualized, and/or validated. In many cases, the various types of sensor have differences, for example with respect to their data rate and/or the number of pairs of lines used. In one application, which includes both types of sensor, a dedicated receiver therefore has to be available for each type of sensor for a common processing unit, or a separate processing unit has to be implemented for each sensor. This results in a high outlay, both in terms of the processing units and in terms of the lines and the connectors.

DE 102015224782 A1 shows a method for operating a radar apparatus for a motor vehicle, in which operating data of a HF device are transmitted to a microcomputer device and are evaluated by said microcomputer device. The HF device can have an interface in the form of a data bus for transferring baseband data from surroundings detection. The required operating data can be transmitted via the digitally developed data bus which is conventionally set up exclusively for the transmission of the baseband data. To this end, the interface can be set up in accordance with, e.g., the LVDS or the MIPI-CSI-2 specification.

EP 3324548 A1 shows a bus system for vehicle systems, via which a plurality of control units (processing units) can transmit data among one another. A camera and a radar control unit can transfer their data to a convertor unit where the data can be combined and modulated for the transmission. The transmission to an ADAS control unit can be effected via a common rapid serial bus.

It is desirable to present an improved transmission solution. In addition, other desirable features and characteristics will become apparent from the subsequent summary and detailed description, and the appended claims, taken in conjunction with the accompanying drawings and this background.

SUMMARY

An apparatus for bundling two data channels via a point-to-point connection has, in one exemplary embodiment, a first data channel which transmits a plurality of sequences of first data via a first line, wherein a data gap having a first predefined size is arranged between two sequences of first data in each case.

In the case of many point-to-point connections, in particular in the case of serial connections, data are transmitted in blocks, i.e., a sequence of multiple data is transmitted, then a pause or "blanking phase", in which no data are transmitted, and subsequently a further sequence of multiple data. That is to say, there is a data gap between two sequences of data in each case. Depending on the bus protocol, said data gap can have a different length or it can always have the same length. In the case of some bus protocols, a predefined size of said data gap can be indicated. The predefined size can always be the same size or depending on the bus protocol, a minimum size can also be defined. The first predefined size of the data gap is understood below to be a quantity of data which are available "net"—i.e., following deduction of a physical and logical protocol overhead, e.g., for the potential inserting of further data.

Furthermore, the apparatus has a second data channel which transmits a plurality of sequences of second data via a second line. The second data channel can, in some embodiments, have another data rate, another number of lines and, in one embodiment, another bus protocol as well.

The first data channel may be utilized to transmit camera raw data and the second data channel may be utilized to transmit raw data from a radar, lidar, ultrasonic, and/or laser system. In particular, radar systems have a significantly lower data rate than camera systems in many ADAS applications.

Furthermore, the apparatus has a third data channel which transmits a sequence of third data via a third line. In this case, the third data channel has, in one embodiment, the same bus protocol as the first data channel.

In addition, the apparatus has a multiplexing apparatus having a multiplexer and a buffer. In this case, a first input of the multiplexing apparatus is connected to the first line and the first input of the multiplexing apparatus is connected to the multiplexer. Drivers may, for example, be arranged between the first input of the multiplexing apparatus and the multiplexer; the first input of the multiplexing apparatus may, however, also be connected directly to the multiplexer. The multiplexing apparatus has a second input which is connected to the second line. The second input of the multiplexing apparatus is connected to the multiplexer via the buffer. The buffer is designed to temporarily store the second data from the second line. The multiplexing apparatus has an output which is connected to the third line and to an output of the multiplexer. Drivers may, for example, be arranged between the output of the multiplexer and the multiplexing apparatus; the output of the multiplexer may, however, also be connected directly to the multiplexing apparatus.

The multiplexer transmits the sequence of first data from the first input of the multiplexing apparatus to the output of the multiplexing apparatus. This substantially happens without a delay, i.e., the first data are substantially routed directly to the output of the multiplexing apparatus, in particular without storing elements being arranged in the path.

The multiplexer transmits the sequence of second data from the second input to the output, if the data gap starts at the first input and if the buffer has been filled with second data having a second predefined size, wherein the second predefined size is smaller than or equal to the first predefined size. The predefined size of the data gap is known. This size may, for example, be predefined by the definition of the bus protocol, by adjustments during the initialization of the bus, or by a determination before each data gap. If the buffer has been filled with second data, and indeed at least to the extent of the second predefined size, then the data gap is filled with these data. The multiplexer is thus designed to make logical decisions whether and when second data are inserted into the data gap of the first data. As a result, the sequences of third data have, at the output of the multiplexing apparatus, a bundling of sequences of first data and sequences of second data. In an embodiment, the buffer can be filled with dummy data after a predefined number of data gaps so that sensors having a lower data rate also transmit their data within a predefined time to the output of the multiplexing apparatus. In an embodiment, multiple second inputs can also be provided with corresponding buffers in order to acquire a plurality of sensor data, for example from various types of sensor. In this case, the entirety of the data from the second data channels must not, on average, exceed the entirety of the data gaps of the first data channel.

The described apparatus thus utilizes the third data channel with a higher utilization than the first data channel. Furthermore, the apparatus saves lines and connectors, driver modules, and/or serializers or similar elements, compared with a system which transmits the first and the third data channel via separate lines in each case. This advantageously happens without any appreciable delay of the data on the first data channel since no storing elements are arranged on this path and the data of the first data channel are transmitted to a certain extent with a higher priority. A further advantage of the apparatus is that—due to the higher integration and the reduced number of lines—a further miniaturization of the systems is possible. In particular, this results in a reduction of the power consumption and in an improvement of the thermal conduct of the total system.

In an embodiment of the apparatus, the point-to-point connection functions on the basis of a CSI-2 protocol.

CSI-2 is a protocol which has been standardized by the Mobile Industry Processor Interface (MIPI) Alliance. In this case, "CSI" stands for "Camera Serial Interface".

In an embodiment, the first data channel and the second data channel have different CSI-2 channel numbers. In the case of the CSI-2 protocol it is provided, as an option, that a virtual channel number is assigned to data packets. In an embodiment, channel 0 can be determined for video data and channel 1 can be determined for radar data in the so-called packet header of the CSI-2. As a result, it is possible to distinguish between radar and video data in the central control unit and to separate them accordingly and, in this case, to send said data via a common physical interface, namely the third data channel. In an embodiment, the third data channel, i.e., for example the connections of sensors or sensor clusters to the central control unit, is realized via an individual LVDS coaxial line.

According to an embodiment, the length of a packet of second data is noted in a header element of the packet of the second data so that the multiplexer can decide with the aid of the length whether and which dimensioning or partitioning of the second data is conducted in the buffer, or whether the buffer can be immediately emptied, i.e., the data contained in the buffer are inserted by the multiplexer into the data gap of the first data.

In other embodiments, data packet lengths may be previously known. In further embodiments, a special marking at the beginning of each relevant data block is utilized, which allows a distinction to be made independently of the length (very similar to the outlined channel principle, i.e. the assignment of data packets to virtual channel numbers).

In an embodiment, the buffer is formed as a FIFO. This makes possible a simple and rapid assignment to the sending times of the data on the second data channel.

In an embodiment, the data rate of the first data channel is more than twice as high, in particular more than four times as high, as the data rate of the second data channel. This dimensioning prevents an overflowing of the buffer.

In an embodiment, the multiplexing apparatus and the buffer are realized as a FPGA, as a CPLD (Complex Programmable Logic Device) or as an ASIC, in particular as a single FPGA, a single CPLD, or as a single ASIC. Other programmable logic circuits are also conceivable for this purpose. This makes possible both a compact and an inexpensive realization of the apparatus, including for smaller or respectively medium-sized series.

In a FPGA, CPLD, or ASIC, the logic of the apparatus may, according to an embodiment, be realized as a finite state machine. This makes possible a particularly clear design and a relatively simple verification of the functionality.

In other words, the FPGA, the CPLD or the ASIC may be configured (i.e., can be programmed or respectively generated) in such a way that the decision whether and when the sequence of second data is transmitted from the second input to the output of the multiplexing apparatus is made by a finite state machine implemented on the FPGA, CPLD, or ASIC.

A method for bundling two data channels on the basis of a CSI-2 protocol is also presented. The method may be implemented with an apparatus such as that described above. The method includes transmitting a plurality of sequences of first data via a first line to a first input of a multiplexing apparatus, wherein the first input is connected to a multiplexer, and wherein a data gap having a predefined size is arranged between two sequences of first data in each case. The method further includes transmitting a plurality of sequences of second data via a second line to a second input of the multiplexing apparatus, wherein the second input is connected to the multiplexer via the buffer which temporarily stores the second data of the second line. If the buffer has been filled with second data having the predefined size at the start of the data gap, the sequence of second data is inserted into the data gap. The method further includes transmitting a plurality of sequences of third data which have a bundling of sequences of first data and sequences of second data.

The indicated apparatus may be used for bundling camera and radar raw data channels.

Furthermore, the disclosure includes a program element which, if a FPGA or a CPLD is programmed or an ASIC is generated therewith, instructs the FPGA, the CPLD, or the ASIC to carry out the outlined method.

Furthermore, the disclosure includes a computer-readable medium, on which the indicated program element is stored.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
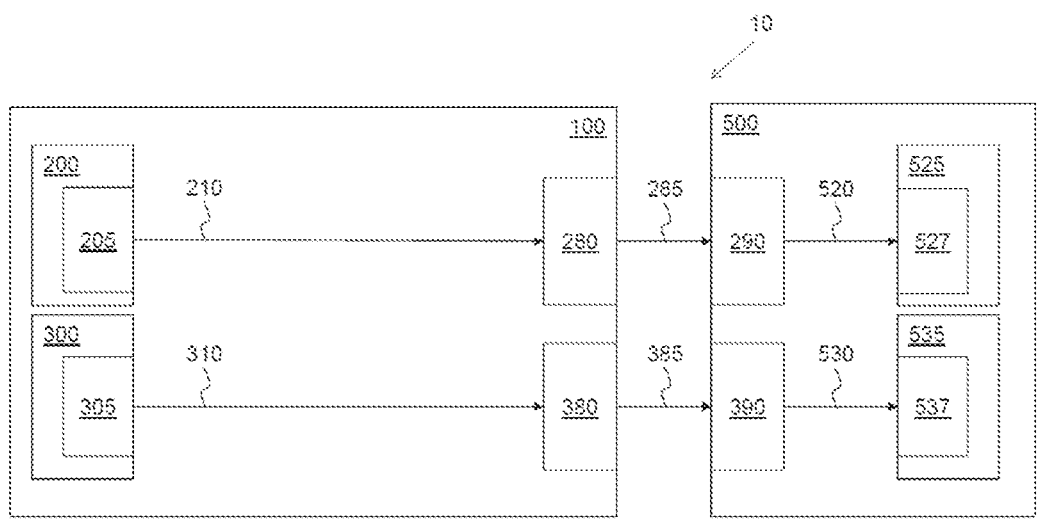
FIG. 1 shows a schematic representation of an apparatus for transmitting camera and radar raw data according to the prior art.

FIG. 1 shows an apparatus 10 for transmitting camera and radar raw data according to the prior art. The apparatus 10 has a sensor apparatus 100 having two data sources for sensor data: a radar transceiver 200 and an image sensor 300. Transmitters 205 and 305 send the radar raw data via a data line 210 and the camera raw data via a data line 310. The sensor apparatus 100 has a sending apparatus 280, 380 for high-speed data transmission for each data channel. These sending apparatuses 280, 380 can be realized, e.g., as LVDS serializers (LVDS: Low Voltage Differential Signaling). The data are transmitted via two lines 285, 385 and are received and processed by a control unit apparatus 500. The control unit apparatus 500 has, in this case, a receiving apparatus 290, 390 for each data channel. These receiving apparatuses can be realized, e.g., as LVDS deserializers. The receiving apparatuses 290, 390 then send the data onto a control unit 525, with a receiver module 527, for the processing of the radar raw data and to a control unit 535, with a receiver module 537, for the processing of the camera raw data.

Figure 2:
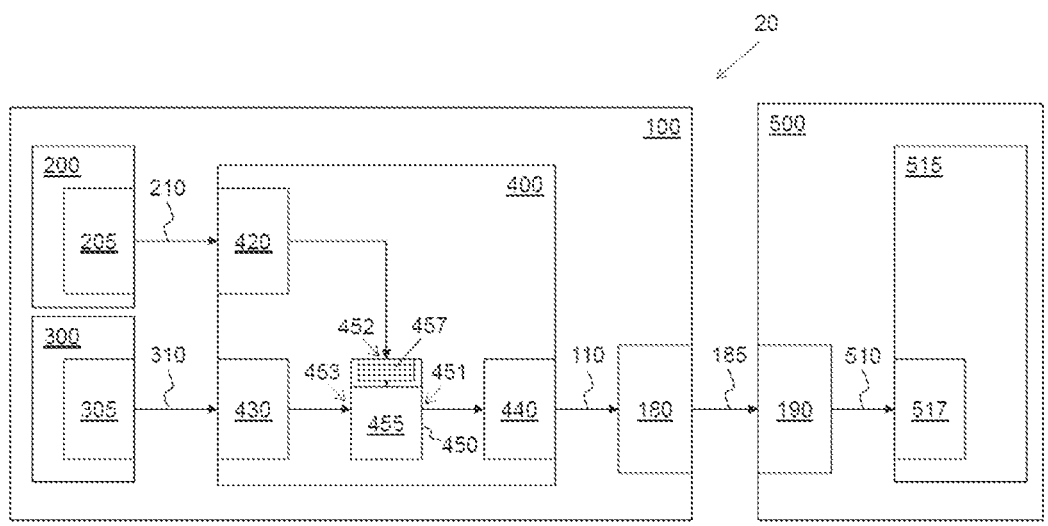
FIG. 2 shows a schematic representation of an embodiment of an apparatus for bundling and transmitting camera and radar raw data according to one exemplary embodiment.

FIG. 2 shows the schematic representation of an embodiment of an apparatus 20 for bundling and transmitting camera and radar raw data according to one exemplary embodiment. The data sources 200, 300 for sensor data are substantially the same as in FIG. 1. The data sources are transmitted via the lines 210, 310 to the drivers (receiver modules) 420, 430. The control unit 400 combines the camera and radar raw data into a common line 110. To do this, the camera raw data are transmitted via the receiver module 430 to a first input 453 of a multiplexing apparatus 450. The camera raw data have, in this case, a plurality of sequences of first data 311 which are transmitted via the first line 310 and the receiver module 430. A data gap 312 having a predefined size is arranged between two sequences of first data 311 in each case. See FIG. 3 for a representation of the data sequences. The first data 311 are transmitted to a multiplexer 455, which is part of the multiplexing apparatus 450, and is forwarded to an output 451. No storing elements are arranged on the path from the first input 453 to the output 451.

Furthermore, the multiplexing apparatus 450 has a second input 452. From there, the radar raw data are transmitted to a buffer 457. The buffer 457 can be implemented as a FIFO (First In First Out). In an embodiment, the size of the buffer 457 is selected to be larger than the data gap 312. Before the start of each data gap 312, the multiplexing apparatus 450 checks the filling level of the buffer 457. If the buffer 457 has reached or exceeded a filling level which corresponds to the size of the data gap 312, then the multiplexing apparatus 450 inserts, utilizing the multiplexer 455, radar raw data from the buffer 457 into the data gap 312. In an embodiment, the data gap 312 cannot be completely utilized, i.e., data are inserted in the case of a filling level of the buffer 457, which is lower than the data gap 312. In an embodiment, the buffer can be filled with dummy data after a predefined number of data gaps so that radar sensors having a lower data rate also transmit their data within a predefined time to the output of the multiplexing apparatus. In this case, the start of the dummy data can be characterized by an escape sequence.

In an embodiment, the length of the radar raw data can be noted in a header element of the radar raw data so that the logic of the control unit 400 can decide whether and which dimensioning or partitioning is conducted or whether the buffer can be immediately emptied.

The common data are then transmitted from the output 451 via the common line 110 to the common sending apparatus 180. The sensor apparatus 100 transmits the common data via a single line 185 to the control unit apparatus 500. The receiving apparatus 190 of the common data can then divide up the data channels again (not shown). In the embodiment shown, the receiving apparatus 190 forwards the common data to a control unit 515, with a receiver module 517, which processes the common data.

In an embodiment, the sensor apparatus 100 and the control unit apparatus 500 are realized on the same assembly. In this case, the connecting cables 185 and the interface drivers 180 and 190 can be dispensed with, and the transmitter 440 and the receiver module 517 can communicate directly with one another.

Figure 3:
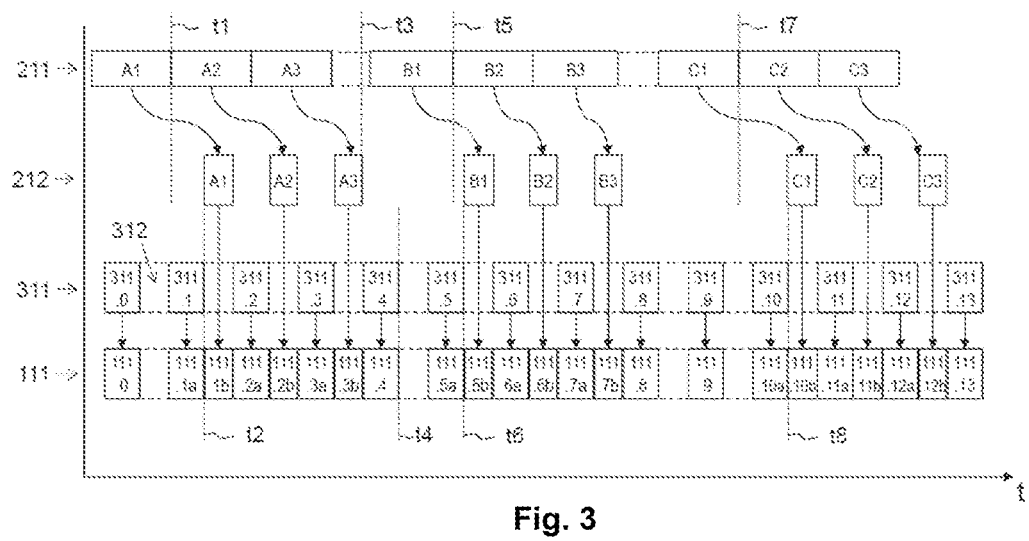
FIG. 3 shows a schematic representation of an embodiment for inserting radar raw data into a data flow having camera raw data according to one exemplary embodiment.

FIG. 3 shows the schematic representation of an embodiment for inserting radar raw data, i.e., second data 211, into a data flow having camera raw data 311, i.e., first data 311. The horizontal axis indicates the time t. The data rate of the radar raw data 211 can, for example, be 60 MB/s, while the data rate of the camera raw data 311 may be 252 MB/s. It is clearly visible that a data gap 312 having a first predefined size is arranged between two sequences of first data 311 in each case. For example, the first data packet 311.0 of the first data 311 corresponds to a line N of a camera image and the second data packet 311.1 corresponds to the line N+1 of the same camera image. The data gap 312 therebetween corresponds, for example, to a camera line "blanking phase".

A first data packet A of radar raw data 211 is, for example, subdivided into three subpackets A1, A2, A3.

The data subpackets A1, A2, A3 are transmitted via the line 210 and the receiver 420 to the buffer 457 and the latter is filled therewith (see FIG. 2). At a time t1, the buffer 457 is filled with data having a second predefined size which is smaller than or equal to the first predefined size. At the start of the data gap 312, i.e. at time t2, the buffered data 212 are inserted into the data gap 312. This produces a common data flow, i.e. third data 111. This is represented in the case of FIG. 3 by means of three radar data packets A (A1, A2, A3), B (B1, B2, B3) and C (C1, C2, C3) (211). These are, in each case, divided up between buffer filling operations A1, A2, A3, etc. (212), in order to be introduced into the respective data gaps 312 of the camera raw data flow 311. This produces the combined third data flow 111, in which e.g. the data packets 111.1a and 111.2a originate from the two camera raw data packets 311.1 and 311.2 (camera image line N+1 and camera image line N+2), and the data packet 111.1b inserted therebetween originates from the buffered radar data packet A1 of the buffer data 212. The data rate of the combined third data flow 111 is, for example, likewise 252 MB/s, that is to say is preferably identical to the data rate of the camera raw data flow 311.

At time t3, all of the data of the radar data packet A (A1, A2, A3) have been transmitted, the buffer 457 is empty. At time t4, the first subpacket B1 of the following radar data packet B is not yet completely in the buffer. The data gap in the camera raw data flow 211, which occurs at this time, is not filled with radar data. On the other hand, as of time t5, sufficient data for the subpacket B1 are in the buffer. With the end of the current camera raw data packet 311.5 (camera image line N+5), the transmission of the radar subpacket B1 from the buffer into the combined data flow 111 starts as a new data packet 111.5*b* at time t6.

At time t7, sufficient data for the first subpacket C1 of the radar data packet C are located in the buffer 457. However, at this time, the line blanking of the camera (data gap between the camera raw data packets of the lines N+9, 311.9 and N+10, 311.10) has already progressed too far, temporally. Therefore, the subpacket C1 could no longer be transmitted by the start of the following camera image line N+10 (camera raw data packets 311.10). The transmission is therefore delayed until the coming data gap in the camera raw data flow 311. With the end of the camera raw data packet of the camera image line N+10, 311.10, that is to say at time t8, the transmission of the radar packet C1 from the buffer to the combined data flow 111 starts as a new data packet 111.10*b*.

A possible implementation envisages a FIFO as a buffer 457. The input 452 of the FIFO 457 is supplied by the second data flow 211. The output of the FIFO provides the buffered data packets 212 of the radar raw data flow 211 for the multiplexer 455.

The camera raw data flow 311 lies at a first input 453 of the multiplexer 455. The data flow 111 combined by the multiplexing apparatus 450 is routed from the output 451 of the multiplexer 455 to the transmitter 440 or respectively to the serializer as a sending apparatus 180 of the common data. The serializer 180 converts the combined data flow 111 into serial signals (e.g., LVDS). The serial data signals can be transmitted to the control unit 515 for evaluation of the sensor raw data.

Figure 4:
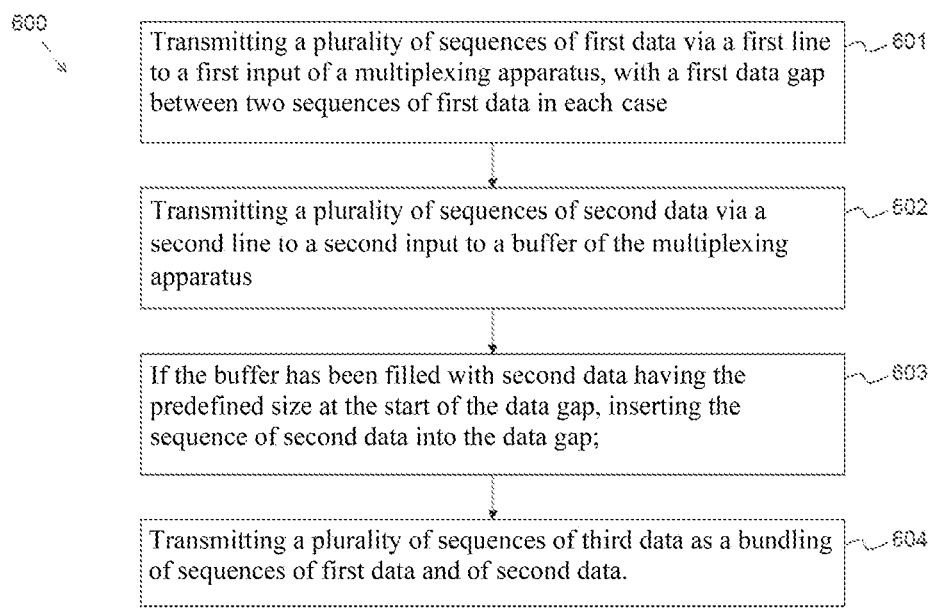
FIG. 4 shows an overview of a method for bundling two data channels via a point-to-point connection according to one exemplary embodiment.

FIG. 4 shows an overview of an exemplary method 600 for bundling two data channels via a point-to-point connection.

At 601, a plurality of sequences of first data 311 is transmitted via a first line 310 to a first input 453 of a multiplexing apparatus 450. In this case, the first input 453 is connected to a multiplexer 455 which is part of the multiplexing apparatus 450. In this case, a first data gap 312 having a predefined size is arranged between two sequences of first data 311 in each case.

At 602, a plurality of sequences of second data 211 is transmitted via a second line 210 to a second input 452 of the multiplexing apparatus 450, wherein the second input 452 is connected to the multiplexer 455 via the buffer 457 which temporarily stores the second data 211 from the second line 210.

At 603 it is checked, at the start of the data gap 312, whether the buffer 457 has been filled with second data 211 having the predefined second size, wherein the second predefined size is smaller than or equal to the first predefined size. If the buffer 457 has been filled with second data having the predefined size at the start of the data gap 312, a sequence of the buffered second data 212 is inserted into the data gap and, thus, a sequence of third data 111 is formed.

At 604, the sequence of third data 111, which has a bundling of sequences of first data 311 and sequences of second data 211, is transmitted to the common data line 110 so that the sequences of third data 111 have a bundling of sequences of first data 311 and sequences of second data 211.

In addition, it is pointed out that "comprising" and "having" do not exclude any other elements or steps and the indefinite article "a" does not exclude a plurality. It is additionally pointed out that features or steps, which have been described with reference to one of the above exemplary embodiments, can also be used in combination with other features or steps of other exemplary embodiments described above.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An apparatus for bundling two data channels via a point-to-point connection, said apparatus comprising:
   a first data channel which transmits a plurality of sequences of first data via a first line, wherein a data gap having a first predefined size is arranged between two sequences of first data in each case;
   a second data channel which transmits a plurality of sequences of second data via a second line;
   wherein the first data channel transmits camera raw data and the second data channel transmits raw data from a radar, lidar, ultrasonic, and/or laser system;
   a third data channel which transmits a sequence of third data via a third line; and
   a multiplexing apparatus having a multiplexer and a buffer, wherein
      a first input of the multiplexing apparatus is connected to the first line and the first input is connected to the multiplexer,
      a second input of the multiplexing apparatus is connected to the second line and the second input is connected to the multiplexer via the buffer which is designed to temporarily store the second data from the second line, and
      an output of the multiplexing apparatus is connected to the third line and the output is connected to an output of the multiplexer, and
   wherein the multiplexer is designed to transmit the sequence of first data from the first input to the output and to transmit the sequence of second data from the second input to the output if, at the time the data gap starts at the first input, the buffer has been filled with second data having a second predefined size, wherein the second predefined size is smaller than or equal to the first predefined size, so that the sequences of third data have a bundling of sequences of first data and sequences of second data.

2. The apparatus according to claim 1, wherein the point-to-point connection functions on the basis of a CSI-2 protocol and wherein the first data channel and the second data channel have different CSI-2 channel numbers.

3. The apparatus according to claim 1, wherein the length of a packet of second data is noted in a header element of the packet of the second data so that the multiplexer is designed to decide with the aid of the length whether and which dimensioning or partitioning of the second data is conducted in the buffer or whether the buffer can be immediately emptied.

4. The apparatus according to claim 1, wherein the buffer is formed as a FIFO.

5. The apparatus according to claim 1, wherein the data rate of the first data channel is more than twice as high as the data rate of the second data channel.

6. The apparatus according to claim 5, wherein the data rate of the first data channel is more than four times as high as the data rate of the second data channel.

7. The apparatus according to claim 1, wherein the multiplexing apparatus and the buffer are realized by a FPGA, a CPLD, and/or an ASIC.

8. The apparatus according to claim 7, wherein the multiplexing apparatus and the buffer are realized by at least one of a single FPGA and a single ASIC.

9. The apparatus according to claim 7, wherein the FPGA, the CPLD, and/or the ASIC is configured in such a way that the decision whether and when the sequence of second data is transmitted from the second input to the output of the multiplexing apparatus is made by a finite state machine implemented on the FPGA, CPLD, and/or ASIC.

10. A method for bundling two data channels on the basis of a CSI-2 protocol by utilizing an apparatus which is configured to execute the following steps:
   transmitting a plurality of sequences of camera raw data as first data via a first line to a first input of a multiplexing apparatus, wherein the multiplexing apparatus includes a multiplexer connected to the first input, and wherein a data gap having a predefined size is arranged between two sequences of first data in each case;
   transmitting a plurality of sequences of raw data from a radar, lidar, ultrasonic, and/or laser system as second data via a second line to a second input of the multiplexing apparatus, wherein the multiplexer is connected to the second input via a buffer which temporarily stores the second data from the second line;
   inserting the sequence of the second data into the data gap in response to the buffer being filled with second data having the predefined size at the start of the data gap; and
   transmitting a plurality of sequences of third data which have a bundling of sequences of first data and sequences of second data.

11. The method according to claim 10, wherein the plurality of sequences of third data are transmitted on a third line connected to an output of the multiplexer apparatus.

12. The method according to claim 10, further comprising a first data channel which transmits the plurality of sequences of camera raw data over via the first line, and a second data channel which transmits the plurality of sequences of raw data via the second line, wherein the first data channel and the second data channel have different CSI-2 channel numbers.

13. The method according to claim 10, wherein the length of a packet of second data is noted in a header element of the packet of the second data so that the multiplexer is designed to decide with aid of the length whether and which dimensioning or partitioning of the second data is conducted in the buffer or whether the buffer can be immediately emptied.

14. The method according to claim 10, wherein the multiplexing apparatus and the buffer are realized by a FPGA, a CPLD, and/or an ASIC, and the buffer is formed as a FIFO.

15. The method according to claim 10, wherein the data rate of the first data channel is more than twice as high as the data rate of the second data channel.

16. The apparatus according to claim 1, wherein the multiplexer is designed to transmit the sequence of second data by inserting the sequence of second data in the data gap.

17. The apparatus according to claim 1, wherein the multiplexer is designed to refrain from transmitting the sequence of the second data from the second input to the output during the data gap if less than a subpacket of the second data has been stored in the buffer at the time the data gap starts at the first input.

18. The apparatus according to claim 1, wherein the multiplexer is configured to determine, before the data gap starts, whether the second predefined size of the second data is stored in the buffer, wherein the sequence of the second data is transmitted to the output of the multiplexer during the data gap upon the determination that the second predefined size of the second data is stored in the butter, and the sequence of the second data is transmitted to the output of the multiplexer during a subsequent data gap upon the determination that less than the second predefined size of the second data is stored in the buffer at the time of the start of the data gap.

19. The method according to claim 10, further comprising determining before the data gap starts whether the predefined size of the second data is stored in the buffer, wherein the sequence of the second data is inserted into the data gap upon the determination that the predefined size of the second data is stored in the buffer, and inserting the second data during a subsequent data gap upon the determination that less than the predefined size of the second data is stored in the buffer at the time of the start of the data gap.

20. The method according to claim 10, wherein the multiplexer is controlled to insert the second data into the data gap to form the sequences of the third data.

* * * * *